INVENTORS.
Lee E. Elfes &
Leo J. Lorenz
BY
Carlson, Pitzner, Hubbard & Wolfe
Attorneys

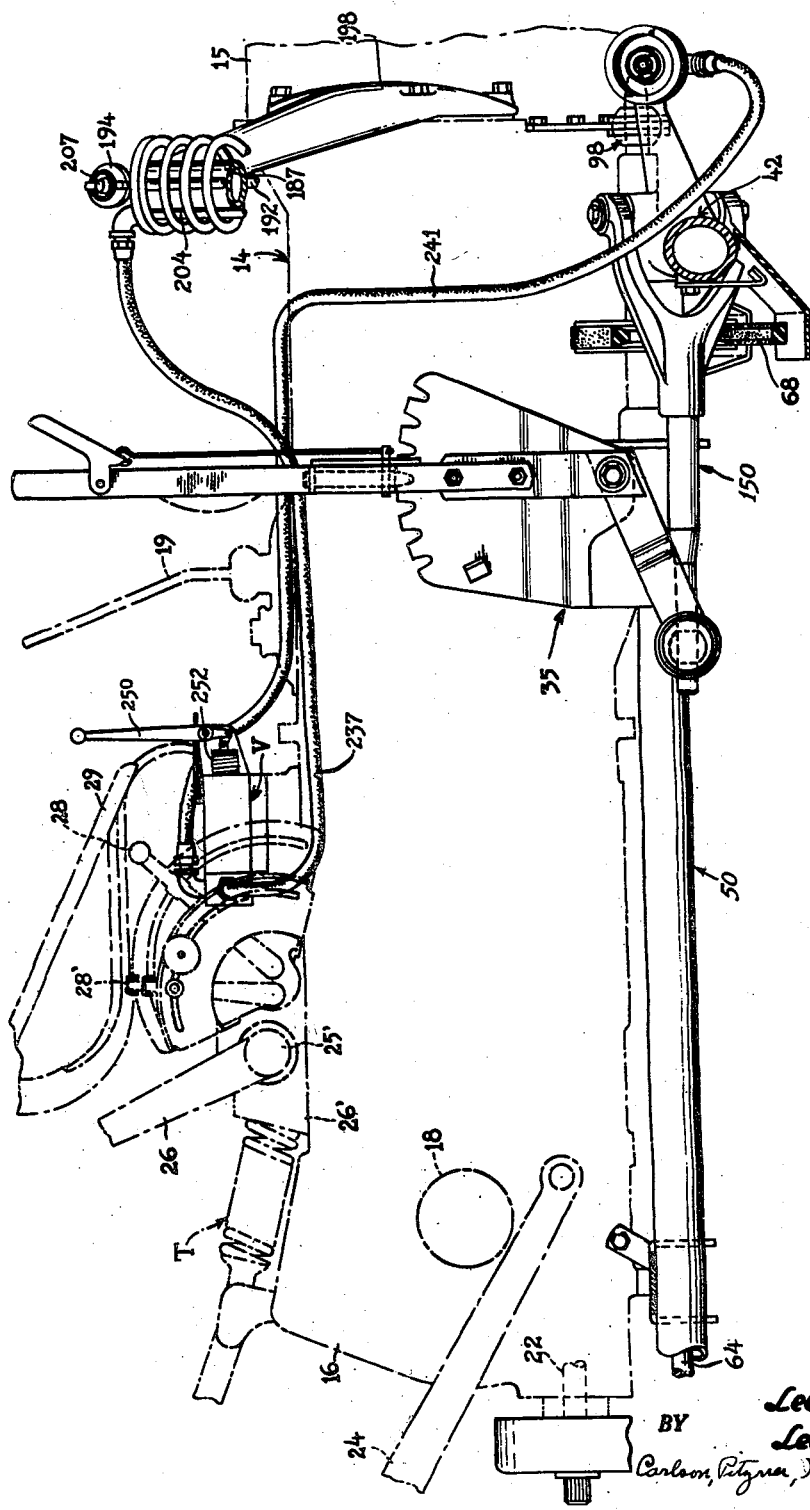

Feb. 11, 1958     L. E. ELFES ET AL     2,822,654
HYDRAULIC LIFTING AND CONTROL MEANS
FOR TRACTOR MOUNTED MOWERS
Filed July 30, 1954     4 Sheets-Sheet 4
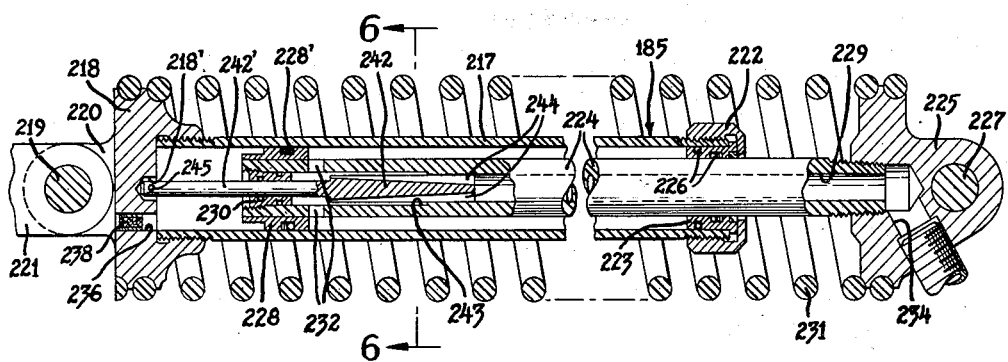
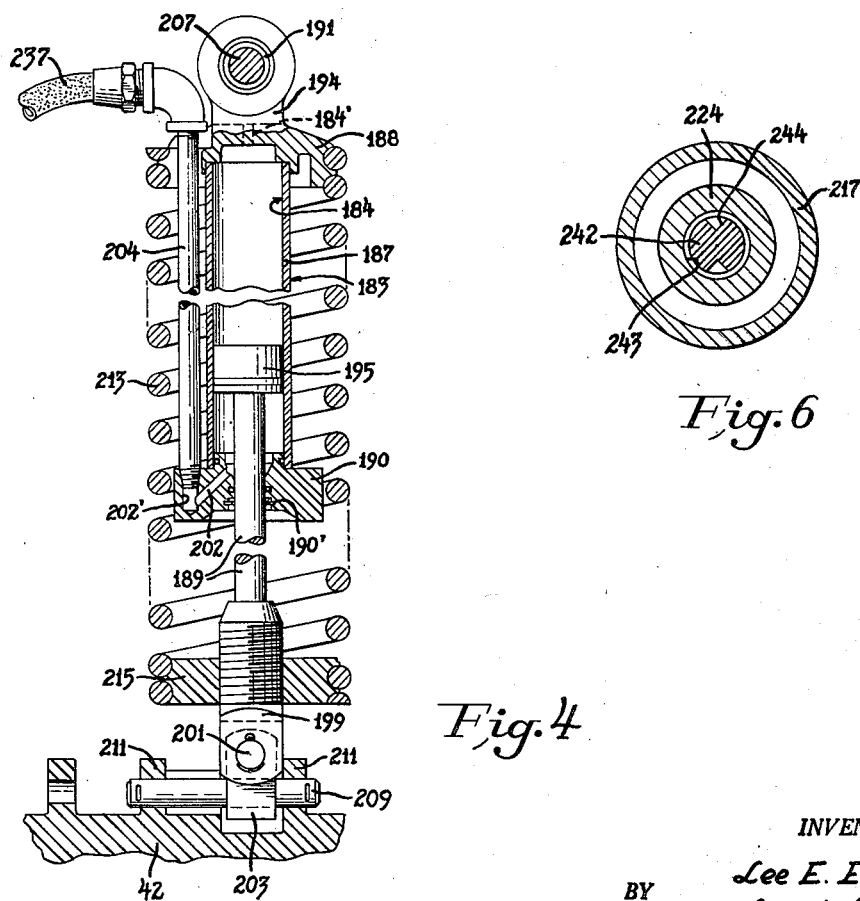
INVENTORS.
Lee E. Elfes &
Leo J. Lorenz
BY
Carlson, Pitzner, Hubbard & Wolfe
Attorneys

United States Patent Office 2,822,654
Patented Feb. 11, 1958

2,822,654

HYDRAULIC LIFTING AND CONTROL MEANS FOR TRACTOR MOUNTED MOWERS

Lee E. Elfes, Birmingham, and Leo J. Lorenz, Detroit, Mich., assignors to Massey-Harris-Ferguson Inc., Racine, Wis., a corporation of Maryland Application July 30, 1954, Serial No. 446,821

7 Claims. (Cl. 56—25)

The invention relates to tractor operated mowers and more particularly to mowers adapted to be mounted at the side of rather than behind a tractor.

One object of the invention is to provide improved mechanism utilizing the power lift of the tractor for raising and lowering the cutter bar and its supporting structure.

Another object is to provide improved mechanism whereby the cutter bar and its support may be raised and lowered independently to position the cutter bar for mowing along or over raised curbs as well as on flat or sloping surfaces.

Another object is to provide improved mechanism operative to swing the cutter bar to a raised, inoperative position very rapidly and to bring it to rest with a minimum of vibration or whip.

Still another object is to provide cutter bar positioning mechanism adapted to be assembled with the other elements of the mower in a unitary structure and capable of being quickly and easily attached to and integrated with the tractor and as quickly and easily detached therefrom.

A further object is to provide cutter bar positioning mechanism which is simple and rugged in construction and efficient and reliable in operation.

Other objects and advantages of the invention will become apparent from the following detailed description of the preferred embodiment illustrated in the accompanying drawings in which Figure 1 is a fragmentary plan view of a mower equipped with cutter bar control or positioning mechanism embodying the features of the invention, the mower being shown as mounted on a tractor.

Fig. 3 is a fragmentary longitudinal sectional view of the mower taken in a vertical plane substantially on the line 3—3 of Fig. 2.

Fig. 4 is a longitudinal sectional view of one of the actuators of the positioning mechanism taken in a plane substantially on the line 4—4 of Fig. 2.

Fig. 5 is an enlarged longitudinal sectional view of another of the actuators taken in a plane substantially on the line 5—5 of Fig. 1.

Fig. 6 is a transverse sectional view taken in a plane substantially on the line 6—6 of Fig. 5.

Figure 1:
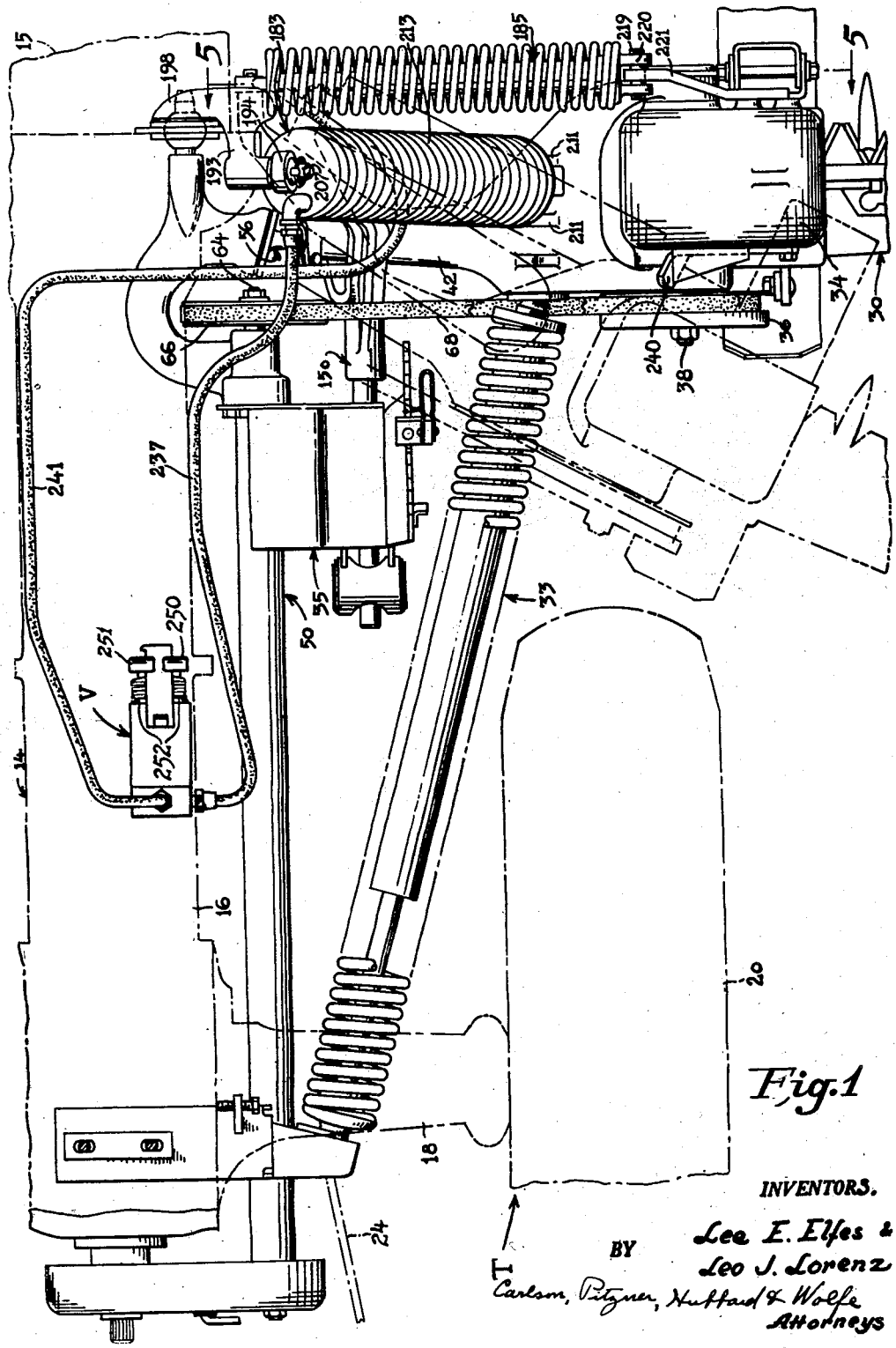

While a preferred embodiment of the invention has been shown and will be described herein, there is no intention to limit the invention to the details of the particular form illustrated, but on the contrary the intention is to cover all modifications, adaptations and alternatives falling within the spirit and scope of the invention as expressed in the appended claims.

For purposes of illustration, the invention has been shown in a form designed for use in the mower disclosed and claimed in our related co-pending application Serial No. 447,984, filed August 5, 1954 and assigned to the same assignee as the present application. Such mowers are well suited for use with tractors equipped with an elevatable implement hitch linkage powered by a hydraulic unit built into the tractor as is found in the "Ferguson" tractor.

The exemplary tractor T has an elongated body 14 comprising a center housing 16 flanged at its forward end for attachment to the flanged casing of the engine 15. Adjacent its rear end, the housing has laterally projecting rear axle housings 18 which support the rear drive wheels 20 of the tractor. The wheels are driven in a well known manner through a power train, including a clutch, a change-speed transmission and a differential, all enclosed in the housing, the transmission being selectively actuated by the usual shift lever 19 (Fig. 3). The tractor engine is also arranged to drive a power take-off shaft 22 projecting at the rear of the tractor body.

The exemplary tractor is equipped with a power elevatable implement hitch linkage, including a pair of draft links 24 trailingly pivoted on the center housing 16. Raising and lowering of the draft links is effected by a hydraulic power unit enclosed in the housing and acting through a lift shaft 25' (Fig. 3) having crank arms 26 connected to the draft links by the usual drop links (not shown). The lift shaft 25' is rotatably supported on a cover plate 26' enclosing the upper portion of the housing 16.

The hydraulic power unit on the tractor may be of any suitable character as, for example, a power unit such as that disclosed in the related co-pending application of Ernest V. Bunting, Serial No. 434,177, filed June 3, 1954, and assigned to the same assignee as the present application. For present purposes it is sufficient to note that the unit includes a source of pressure fluid, such as an engine driven pump, and appropriate valving whereby raising and lowering of the draft links is effected under joint control of means responsive to the draft load on the hitch linkage, a manually operable control lever 28 and a manually operable depth setter 28'. The control lever and depth setter are mounted within convenient reach of the driver occupying the seat 29. In the particular tractor illustrated, the pressure fluid supply system is connected to the fluid operated actuators of the instant invention by way of a suitable control valve V.

The improved cutter bar positioning mechanism, while applicable to other side-mounted mowers, is particularly well suited for use with a mower of the type disclosed in our co-pending application above referred to and in which it has been shown incorporated here. In the exemplary mower, the cutter bar 30 (Fig. 1) is carried by a drivehead 34 pivotally supported at the outer end of the drag bar 42 to swing about a horizontal generally fore-and-aft axis. The drag bar 42 in turn is supported for universal pivoting movement by a ball and socket connection 56 on a frame structure 50 mounted on and extending along the side of the tractor as shown in detail in our co-pending application, above-mentioned. Breakback mechanism indicated generally at 33 connected between the frame structure and the drag bar normally holds the latter in a position such that the cutter bar projects laterally substantially at right angles to the axis of the tractor, as shown in full lines in Fig. 1. If the cutter bar strikes an obstruction, the break-back mechanism yields and permits the cutter and drag bars to swing rearwardly as a unit about the pivotal connection of the latter to the frame structure, the break-back position being shown in broken lines in Fig. 1.

Also carried by the frame structure 50 is drive mechanism for driving the cutter bar from the tractor power take-off shaft and manually operable mechanism 35 for adjusting the fore-and-aft tilt of the cutter bar. The latter includes a lever 150 pivotally connected to the drag bar and supported on the frame structure so that it can be rocked transversely of its longitudinal axis to swivel the drag bar about its connection 56 with the frame structure. The drive mechanism includes a shaft 64 journaled on the frame structure and having a pulley 66 drivingly coupled by a V-belt 68 with a pulley 36 fast on a shaft 38 constituting the drive shaft for the drivehead 34. The arrangement is such that when the cutter bar is in its normal transverse position, power is transmitted to the head for reciprocating the knife of the cutter bar.

The universal pivotal mounting of the drag bar 42 on the mower frame structure permits it to swing rearwardly as a unit with the cutter bar under control of the breakback mechanism 33 and permits it to rock about its longitudinal axis under control of the tilt mechanism 35. It also permits the drag bar to swing in a vertical plane to locate the inner end of the cutter bar at selected operating levels between the lower operating position, shown in full lines in Fig. 2, and the fully raised or retracted position, shown in dot-dash lines in that figure. Such positioning of the drag bar as well as the swinging of the cutter bar 30 and the drivehead 34 about their pivot on the drag bar is effected by the improved positioning mechanism. It is to be noted that the cutter bar is mounted to swing relative to the drag bar through a substantial angle at either side of the horizontal position in which it is shown in full lines in Fig. 2. Thus, although the inner end of the cutter bar may be raised above the position in which it is shown, as, for example, to clear a curb, the cutter bar can be adjusted to an appropriate position for operating on either level or sloping ground. The uppermost position in which the cutter bar is shown in dot-dash lines represents the transport position, the cutter bar being disclosed almost vertical so that minimum clearance is required at the side of the tractor.

In accordance with the invention, the positioning mechanism is hydraulically operated, and to provide maximum flexibility of control it embodies two independently operable actuators 183 and 185. In the exemplary mower the actuator 183 is connected between the drag bar 42 and a suitable fitting provided on the tractor and is operable to swing the drag bar about its pivot on the frame structure for raising and lowering the outer end of the bar. The actuator 185, on the other hand, is connected between the drag bar and the cutter bar to swing the latter about its pivot on the drag bar.

Figure 2:
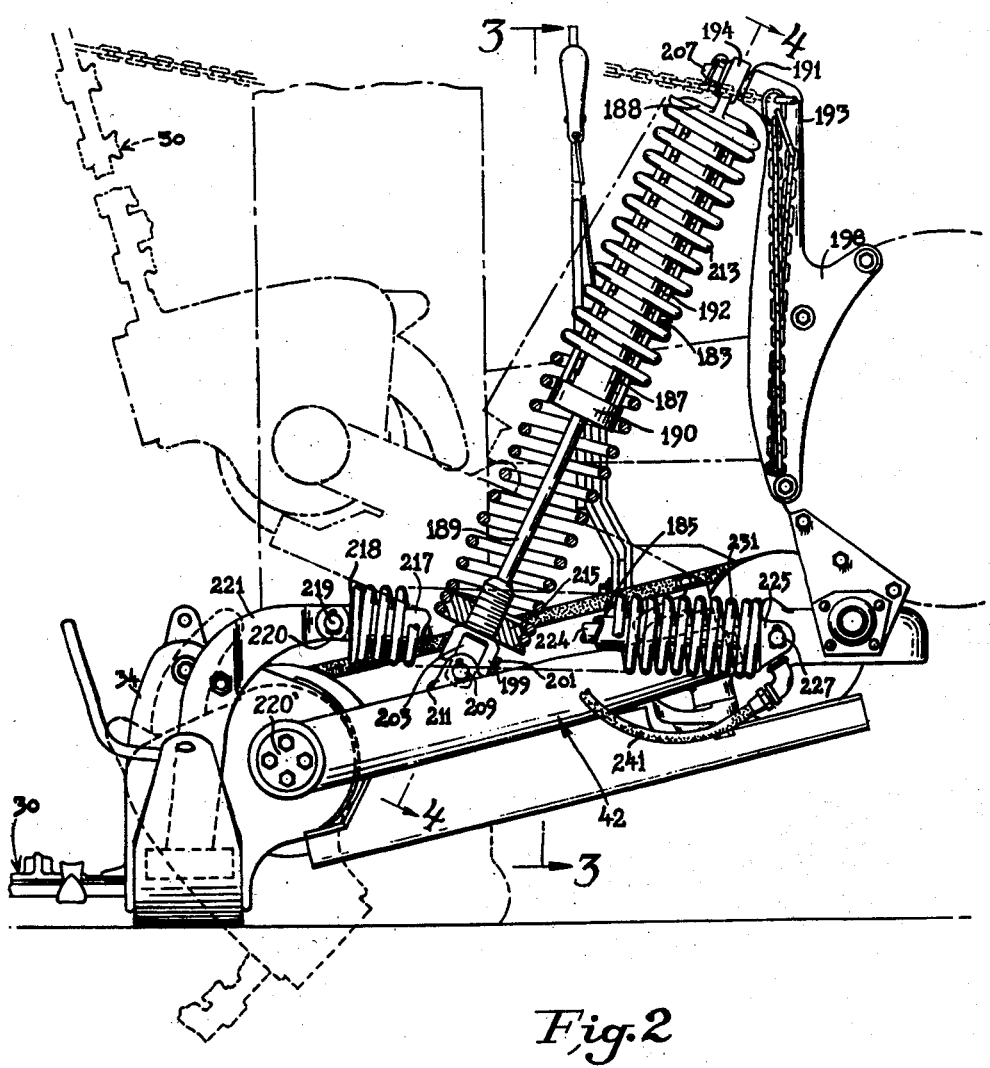
Fig. 2 is a fragmentary front elevational view of the mower with parts broken away and shown in section.

Turning now to a more detailed consideration of the positioning mechanism, and referring particularly to Figs. 2 and 4 of the drawings, the actuator 183 as shown includes a cylinder 184 comprising a tubular member 187 closed at opposite ends by end members or cylinder heads 188 and 190. The end members are suitably shaped for coaction with the ends of the tubular member and are rigidly clamped thereto as by clamping bolts 192 (Fig. 2) extending along the sides of the cylinder. The cylinder is fitted with a piston 195 having a piston rod 189 extending through an opening with the end member 190. Sealing rings 190' prevent leakage of fluid around the piston.

Preferably, the cylinder 184 is mounted on or anchored to the tractor and the piston rod is suitably secured to the drag bar. To accommodate the universal swinging movements of the drag bar, the tractor mounting of the cylinder is effected through the medium of an apertured ball 191 socketed in an extension 194 formed on the cylinder end member 188. The ball is adapted to fit over a pin or stud 207 which, in this instance, is carried at the end of a generally upright arm 193 forming a part of a bracket 198 adapted to be secured to the body of the tractor. To facilitate installation, the bracket 198 is constructed so that it may be attached to the tractor body adjacent the mating flanges of the center housing and the engine and by the same bolts utilized to secure those tractor elements together. The bracket of course may be left on the tractor permanently if desired so that installation of the mower requires merely the fitting of the ball 191 over the pin 207.

A universal pivotal connection is also provided between the piston rod 189 and the drag bar 42 to accommodate the various movements of the drag bar. As herein shown, the piston rod is provided at its lower end with a bifurcated head 199 straddling and pivotally connected as by a pin 201 to a short link 203. The link in turn is pivoted on a pin 209 carried between a pair of upstanding lugs 211 formed on the drag bar 42. Pins 201 and 209 being disposed at right angles permit substantially universal pivoting movement between the connected parts.

Pressure fluid is supplied to and exhausted from the lower end of the cylinder 184 by way of a passage 202 (Fig. 4) formed in the end member 190. An axially disposed branch passage 202' provides for connection with a supply pipe 204 which extends along the side of the cylinder 187 and through an opening in the companion end member 188. The pipe is provided with a suitable fitting for connection with a flexible conduit 237 connecting with the valve V as described hereinafter. A breather opening 184' which may be fitted with a suitable filter plug is provided in the fitting 188 at the upper end of the cylinder.

Provision is made for counterbalancing a part of the overhanging weight of the drag bar and cutter bar assembly to ride lightly over the ground and readily follow changes in ground contour. The counterbalancing means in its preferred form comprises an extensible coil spring 213 disposed around the cylinder 187 and anchored at one end to the cylinder end member 188 as by engagement with helical threads or grooves formed in the member. At its other or lower end, the spring is threadedly engaged with a helically grooved plug or collar 215 threaded on the shank portion of the head 199. The tension of the spring may be adjusted by screwing the collar up or down relative to the head as required.

The actuator 185 for raising and lowering the cutter bar 30 is also of the cylinder and piston type and is characterized by the novel arrangement provided for swinging the cutter bar into its fully retracted position without producing excessive vibration or whip. This enables full advantage to be taken of the rapid action of the actuator to raise the cutter bar for clearing obstacles and at the same time avoids endangering the driver of the tractor through the whipping action of the free end of the bar when it is raised to fully retracted position.

Referring to Figs. 2 and 5 of the drawings, the actuator 185, in its preferred form, comprises a cylinder 217 closed at one end by a plug 218 and at the other end by a plug 222, both threaded on the cylinder. In the exemplary embodiment the cylinder constitutes the movable element of the actuator and it is operatively connected for swinging the cutter bar by a pin 219 pivotally connecting a lug 220 on the plug 218 with a lever 221 fixed to the drivehead 34. Lever 221 is disposed to provide a moment arm with respect to the pivotal axis 220' with the drivehead extending substantially normal to the axis of the actuator.

A flange guide sleeve 223 fitted into the inner end of the cylinder 217 and clamped in place by the plug 222 supports and guides a piston rod 224 which extends back through a central opening in the plug and is threaded into an anchoring fitting 225. As herein shown, the fitting is apertured to receive a pin 227 carried on the drag bar 42, thus pivotally connecting the piston rod to the drag bar. Suitable sealing rings 226 provided in the guide sleeve seal the rod end of the cylinder against leakage.

As shown in Fig. 5, the piston rod 225 has a piston element 228 brazed or otherwise secured to its inner end. The piston element is slidably fitted in the cylinder 217 and suitably grooved to carry a sealing ring 228' coacting with the walls of the cylinder. In the preferred form of the actuator shown, pressure fluid is introduced into the rod end of the cylinder 217 and exhausted therefrom by way of a passage 229 formed in and extending axially of the piston rod 224. A plug 230 closes the passage from the outer end of the cylinder ahead of the piston and communication with the cylinder behind the piston is established by way of radial ports 232 opening from the passage 229.

At the outer end of the piston rod, the passage 229 opens into a passage 234 in the anchoring fitting 225. This latter passage is connected to the valve V by means of suitable fittings and a flexible conduit 241. Introduction of pressure fluid by way of the conduit 241 into the rod end of the cylinder shifts the cylinder toward the right (as viewed in Figs. 2 and 5) thus reducing the effective length of the actuator and swings the cutter bar upwardly about its pivot on the drag bar. In this movement, air entrapped in the outer end of the cylinder is exhausted through a port 236 in the end member 218. The port is preferably fitted with a suitable filter 238 to prevent entry of dust or other foreign material in the outward movement of the cylinder.

Provision is also made for counterbalancing the weight of the cutter bar so that it can easily follow changes in ground contour. This counterbalancing means may conveniently take the form of an extensible coil spring 231 disposed around the cylinder 217 and anchored at opposite ends to the end member 218 of the cylinder and the anchoring fitting 225. For convenience in attaching the spring, the plug and fitting may be formed with helical grooves adapted to receive the spring in threaded engagement.

In the exemplary mower, the actuator 185 is constructed and dimensioned to provide for swinging the cutter bar between the limit position shown, respectively, in broken and dot-dash lines in Fig. 2. The latter or fully retracted position is determined by a stop 240 (Fig. 1) on the drivehead disposed to engage the upper surface of the drag bar 42. As the swinging of the cutter bar is effected through the lever 221, it will be evident that the moment arm through which the force is applied to the bar will decrease progressively as the bar approaches the fully retracted position. With a conventional hydraulic actuator, the bar would therefore reach its maximum speed substantially at the time the stop 240 engages the drag bar. The abrupt interruption of this movement would obviously cause the free end of the bar to vibrate or whip back and forth and present a serious danger to the driver of the tractor.

In accordance with the invention the dangerous whipping of the cutter bar is avoided by providing means in the actuator adapted to automatically compensate for the change in the moment arm and to bring the bar to a smooth, shockless stop without appreciably increasing the time required to retract the bar. The compensating means in its preferred form comprises a metering element or pin 242 slidable in the passage 229 in the piston rod 224 adjacent the ports 232. As shown in Fig. 5, the pin is formed with a reduced end portion 242' extending through and guided in an opening in the plug 230 which closes the end of the passage 229. The passage 229 adjacent the ports 232 has an enlarged section 243 somewhat shorter than the pin so that the latter is supported at its inner end when shifted to its extreme outward position, that is, into engagement with the plug 230.

As shown in Figs. 5 and 6, the pin 242 is formed with longitudinally extending slots 244 (two in the present instance) which may conveniently be V-shaped in cross-section. These slots are tapered progressively lengthwise of the pin, being deepest adjacent the inner end of the pin and becoming progressively shallower toward the opposite end. The arrangement is such that when the pin is in its outer position, the slots define openings of maximum effective area for the flow of pressure fluid from the passage 229 into the enlarged section 243 and out through the ports 232 into the cylinder 217. As the pin is shifted inwardly (to the right as viewed in Fig. 5) the effective area of the flow openings is progressively decreased and consequently the rate of movement of the cylinder is correspondingly slowed down.

When the actuator is extended, the pin 242 is shifted to and maintained in its outer or full open position by the pressure of the fluid introduced through the passage 229. Upon collapse of the actuator in a lifting operation, that is, upon inward movement of the cylinder, the end member 218 engages the projecting portion 242' of the metering pin and shifts it inwardly to restrict fluid flow into the cylinder. Inward movement of the metering pin is limited by a stop pin 245 extending crosswise of the reduced end portion 242' and engageable with the outer end of the plug 230. The end member 218 is suitably recessed as in 218' to afford clearance for the pin when the cylinder is in its inward position.

The projecting portion 242' of the metering pin is dimensioned so that engagement by the cylinder end member 218 occurs sufficiently ahead of the end of the cylinder stroke to effect a gradual slow-down of the cutter bar and bring it to rest in the fully retracted position substantially without shock or vibration and consequently without any whipping action. It will be evident, however, that throughout the major portion of the lift, fluid flow to the actuator will be substantially unrestricted so that the cutter bar is raised rapidly in all except the end portion of its swing. This is particularly advantageous when the cutter bar has to be raised to clear or dodge an obstruction, and appropriate action usually can be taken without stopping or even slowing down the tractor. At the same time, dangerous whipping of the cutter bar is avoided when it is raised to fully retracted position.

Any suitable valve means may be utilized for controlling the delivery of fluid to and exhaust of fluid from the actuators 183 and 185. Thus, if desired, the fluid supply may be controlled by a single manually operable direction valve acting in conjunction with a suitable sequence valve for determining the order of operation of the actuators. However, for maximum flexibility of control, a valve providing independent control of the two actuators is preferred, and the valve V shown herein by way of illustration is of that type.

For present purposes, it is sufficient to note that the valve V has two valve elements operable independently by a pair of hand levers 250 and 251 (Fig. 1) to control fluid flow through the conduits 237 and 241 to and from the actuators 183 and 185, respectively. Each lever is yieldably urged to a neutral position (shown in Fig. 1) as by a spring 252 and is shiftable either forwardly or rearwardly therefrom. The porting of the exemplary valve is such that rearward shifting of the lever 250 actuates the valve so as to direct a flow of pressure fluid through the conduit 237 to the actuator 183 to raise the drag bar and cutter bar assembly. When the hand lever is permitted to return to neutral position, fluid is locked in the actuator cylinder by a check valve incorporated in the valve V. This check valve may be opened by shifting the lever 250 forwardly thus opening the conduit 237 to exhaust and permitting fluid in the actuator to drain back to the sump or reservoir in the tractor, the drag bar and cutter bar assembly descending by gravity. Such descent may be interrupted at any point by returning the lever to neutral position.

Control of the cutter bar 30 is similarly effected by manipulation of the hand lever 251. When the hand lever is in neutral position, fluid is locked in the actuator cylinder and the cutter bar remains stationary. Upon rearward shifting of the hand lever 251 pressure fluid is directed through the conduit 241 to the actuator 185 which acts to swing the cutter bar upwardly about its pivot on the drag bar. Conversely, forward shifting of the lever 251 permits fluid to exhaust from the actuator as the cutter bar swings downwardly.

In the preferred valve arrangement, the porting of the valve V is such that the actuators 183 and 185 may be operated to raise or lower the associated mower elements simultaneously or to raise or lower either element while the other is stationary. Furthermore, the drag bar 42 may be raised while the cutter bar 30 is in the process of being lowered, but for safety reasons, the reverse operation is not permitted. In other words, the porting does not permit lowering of the cutter bar while the drag bar is being raised.

It will be apparent from the foregoing, that the invention provides control or positioning mechanism for side-mounted mowers which is simple and rugged in construction, which is easy to mount on and remove from the tractor, and which materially simplifies and facilitates the operation of such implements. The novel arrangement utilizing the power of the tractor for raising and lowering the drag bar and the cutter bar reduces the labor involved and materially speeds up those actions and correspondingly increases operating efficiency. Furthermore, the independent control of the drag bar and the cutter bar clearly extends the utility of the mower and permits it to operate with full efficiency under the widely varying conditions commonly encountered in mowing the shoulders of the highways and the like.

We claim as our invention:

1. In a mower, the combination with a frame mountable on a tractor, a drag bar supported at one end on said frame to swing in both vertical and horizontal planes, a cutter bar pivoted adjacent the other end of said drag bar to swing only in a vertical plane, a pressure fluid operated actuator connected to the tractor, means connecting said actuator to the drag bar to enable it to raise and lower the drag bar, another pressure fluid operated actuator connected to said drag bar, means connecting said other actuator to said cutter bar to enable it to swing that bar about its pivot, and a pressure fluid supply system on the tractor including a manually operable valve for supplying pressure fluid to said actuators from a fluid source on the tractor.

2. In a mower, the combination with a frame mountable at one side of a tractor, a drag bar supported at one end on said frame to swing in both vertical and horizontal planes, a cutter bar pivoted adjacent the other end of said drag bar to swing only in a vertical plane, a pressure fluid operated actuator carried by and connected to said drag bar, means operatively connecting said actuator to said cutter bar to enable it to swing the cutter bar about its pivot, a second pressure fluid operated actuator, coupling elements providing universal pivot connections between said second actuator and said drag bar and between that actuator and the tractor permitting unrestricted movement of the drag bar in both vertical and horizontal planes, and a hydraulic system on the tractor for supplying pressure fluid to said second actuator to swing said drag bar upwardly.

3. In a mower, the combination with a frame mountable at one side of a tractor, a drag bar supported at one end on said frame to swing in both vertical and horizontal planes, a cutter bar pivoted adjacent the outer end of said drag bar to swing only in a vertical plane, a pressure fluid operated actuator carried by said drag bar, means connecting said actuator to said cutter bar to enable it to swing the cutter bar about its pivot, a second pressure fluid operated actuator comprising a cylinder and a piston, end members closing the ends of said cylinder, means on one of said members for anchoring the cylinder to the tractor, a rod extending from said piston through the other of said members, a head on the outer end of said rod, a link connected at one end to said head for pivotal movement on an axis transverse to the axis of said rod, and means connecting the other end of said link to said drag bar for pivotal movement on an axis disposed substantially at right angles to the first mentioned pivotal axis.

4. In a mower, the combination with a frame mountable at one side of a tractor, a drag bar supported at one end on said frame to swing in both vertical and horizontal planes, a cutter bar pivoted to the outer end of said drag bar to swing only in a vertical plane, a pressure fluid operated actuator carried by said drag bar, means operatively connecting said actuator to said cutter bar to enable it to swing the cutter bar about its pivot, a second pressure fluid operated actuator comprising a cylinder and piston, a rod projecting at one end of said cylinder and connecting said piston with said drag bar, a head secured to and closing the other end of said cylinder, an extension on said head defining a spherical socket, and a ball element seated in said socket and adapted to be connected to the tractor to support said second actuator.

5. In a mower, the combination with an elongated, flexible cutter bar and a frame structure for supporting it at one end from a tractor for movement between a generally horizontal cutting position and a generally upright transport position, of a power operated actuator connected between said frame structure and said cutter bar for raising the cutter bar to such transport position, and a control device associated with said actuator operable automatically as an incident to the near completion of raising movement of said cutter bar for slowing down its movement by the actuator and thereby preventing dangerous whipping of the free end of the bar that would otherwise take place upon an abrupt stoppage of its movement.

6. In a mower, the combination with an elongated, flexible cutter bar and means supporting it at one end from a tractor for pivotal movement between a generally horizontal cutting position and a generally upright transport position, of a pressure fluid operated actuator connected with and operable to swing the cutter bar to said transport position, and a metering valve connected to control the supply of pressure fluid to said actuator operative automatically upon the approach of the cutter bar to transport position for reducing the supply of pressure fluid to thereby slow down the movement of the bar sufficiently to prevent dangerous whipping of the free end of the bar as its motion is interrupted on reaching transport position.

7. In a mower, the combination with an elongated flexible cutter bar and means supporting the bar at one end to project laterally of the tractor and to swing from a generally horizontal cutting position to a generally upright position alongside the tractor driver's seat, of a pressure fluid operated actuator connected with and operative to swing the bar to said upright position, a pressure fluid supply system on the tractor including a control valve operable by the tractor driver to initiate the delivery of pressure fluid to said actuator to start the swing of the bar to upright position, and a metering valve connected to control fluid flow to the actuator operable automatically as an incident to the approach of the bar to upright position for gradually reducing the supply of pressure fluid to slow down the movement of the bar sufficiently to prevent the free end from whipping and endangering the driver when it is stopped abruptly in the upright position.

References Cited in the file of this patent

UNITED STATES PATENTS

| | | |
|---|---|---|
| 635,848 | Dutton | Oct. 31, 1899 |
| 2,236,598 | Hautzenroeder | Apr. 1, 1941 |
| 2,291,987 | Rodgers | Aug. 4, 1942 |
| 2,457,693 | Leicy | Dec. 28, 1948 |
| 2,588,002 | Holmes | Mar. 4, 1952 |
| 2,729,044 | Dunn et al. | Jan. 3, 1956 |